(12) United States Patent
Schlegel et al.

(10) Patent No.: US 12,299,481 B2
(45) Date of Patent: May 13, 2025

(54) CONFLICT RESOLUTION METHOD FOR A REMOTELY CONTROLLED DEVICE AND CONFLICT RESOLUTION SYSTEM

(71) Applicant: ABB Schweiz AG, Baden (CH)

(72) Inventors: Roman Schlegel, Wettingen (CH); Thomas Locher, Zurich (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/822,534

(22) Filed: Mar. 18, 2020

(65) Prior Publication Data

US 2020/0218570 A1 Jul. 9, 2020

Related U.S. Application Data

(63) Continuation of application No. PCT/EP2018/074762, filed on Sep. 13, 2018.

(30) Foreign Application Priority Data

Sep. 18, 2017 (EP) .................................. 17191639

(51) Int. Cl.
*G08G 1/005* (2006.01)
*B63H 25/04* (2006.01)
(Continued)

(52) U.S. Cl.
CPC .......... *G06F 9/4881* (2013.01); *G06F 9/4818* (2013.01); *G06F 9/524* (2013.01); *G06F 11/3006* (2013.01)

(58) Field of Classification Search
CPC .. G06F 11/3006; G06F 9/4818; G06F 9/4881; G06F 9/524; H04L 12/40143; H04L 2012/40286
See application file for complete search history.

(56) References Cited

U.S. PATENT DOCUMENTS 5,471,253 A * 11/1995 Nguyen ............. H04N 21/4854
348/725
5,519,709 A 5/1996 Albrecht et al.
(Continued)

FOREIGN PATENT DOCUMENTS

JP 2003-120984 A 4/2003
JP 2007-131275 A 5/2007
(Continued)

OTHER PUBLICATIONS

European Patent Office, International Search Report & Written Opinion issued in corresponding Application No. PCT/EP2018/074762, mailed Nov. 13, 2018, 14 pp.
(Continued)

*Primary Examiner* — Jorge A Chu Joy-Davila
(74) *Attorney, Agent, or Firm* — Greenberg Traurig, LLP

(57) ABSTRACT

A conflict resolution method for a remotely controlled device is provided. The method includes: issuing a command for the device by a remote control center or by the device; determining a criticality level of the command; depending on the criticality level of the command, sending the command to the other one of the device and the control center for acknowledgment or refusal of the command; and executing or disregarding the command by the device depending on the criticality level of the command and, if applicable, on the acknowledgment or refusal of the command.

18 Claims, 3 Drawing Sheets

(51) Int. Cl.
*G05B 19/4068* (2006.01)
*G06F 9/48* (2006.01)
*G06F 9/52* (2006.01)
*G06F 11/30* (2006.01)

(56) References Cited

U.S. PATENT DOCUMENTS

| | | | | |
|---|---|---|---|---|
| 6,133,867 | A * | 10/2000 | Eberwine | G01S 5/0072 342/125 |
| 6,633,800 | B1 * | 10/2003 | Ward | G05D 1/0038 701/34.2 |
| 9,871,772 | B1 * | 1/2018 | Weinstein | H04L 63/123 |
| 10,924,582 | B2 * | 2/2021 | Redmann | H04L 67/322 |
| 2001/0047213 | A1 * | 11/2001 | Sepe, Jr. | E05F 15/70 700/65 |
| 2003/0058135 | A1 * | 3/2003 | Kimmet | B64D 45/0059 340/945 |
| 2007/0064147 | A1 * | 3/2007 | Kondo | H04N 21/42218 348/383 |
| 2008/0229084 | A1 * | 9/2008 | Wei | H04L 12/40163 712/244 |
| 2009/0043941 | A1 * | 2/2009 | Brahmaroutu | G06F 13/4022 710/314 |
| 2009/0174362 | A1 * | 7/2009 | Richardson | H02J 7/0034 320/105 |
| 2010/0029117 | A1 * | 2/2010 | Underwood | G02B 6/3895 439/304 |
| 2010/0114404 | A1 * | 5/2010 | Donnelly | B61D 15/00 701/2 |
| 2010/0161868 | A1 * | 6/2010 | Ueno | G06F 13/36 710/308 |
| 2010/0195503 | A1 | 8/2010 | Raleigh | |
| 2010/0216509 | A1 * | 8/2010 | Riemer | H04M 1/72463 455/557 |
| 2011/0006880 | A1 * | 1/2011 | Long | A61B 5/1172 340/5.83 |
| 2012/0047291 | A1 * | 2/2012 | Davis | G07C 5/0825 710/14 |
| 2012/0185862 | A1 * | 7/2012 | Arcese | G06F 9/4881 718/103 |
| 2012/0317132 | A1 | 12/2012 | Brady et al. | |
| 2013/0103973 | A1 * | 4/2013 | Werth | H04L 67/34 714/2 |
| 2013/0131837 | A1 * | 5/2013 | Washington | F24F 13/068 700/12 |
| 2013/0318720 | A1 * | 12/2013 | Connell | A61G 7/0506 5/658 |
| 2014/0156030 | A1 * | 6/2014 | Okamoto | H04N 21/4316 700/20 |
| 2014/0277846 | A1 * | 9/2014 | Melster | F02N 11/0818 701/2 |
| 2015/0052308 | A1 * | 2/2015 | Ray | G06F 12/0875 711/125 |
| 2015/0220710 | A1 * | 8/2015 | Cherubini | G06F 21/31 726/19 |
| 2016/0194014 | A1 * | 7/2016 | Rajendran | H04W 4/46 701/2 |
| 2016/0212851 | A1 * | 7/2016 | Hu | H05K 1/185 |
| 2017/0308080 | A1 * | 10/2017 | Brooks | G05D 1/0027 |
| 2018/0210440 | A1 * | 7/2018 | Matsuzaki | G05D 1/0027 |
| 2019/0036141 | A1 * | 1/2019 | Yamane | G01R 21/133 |
| 2019/0093433 | A1 * | 3/2019 | Aguirre | E21B 21/062 |
| 2020/0149204 | A1 * | 5/2020 | Xu | D06F 34/08 |

FOREIGN PATENT DOCUMENTS

JP 2009-260712 A 11/2009
JP 2014-064256 A 4/2014

OTHER PUBLICATIONS

European Patent Office, Extended Search Report issued in corresponding Application No. 17191639.8, mailed Sep. 21, 2018, 10 pp.

Intellectual Property Office of Singapore, Invitation to Respond to Written Opinion and Written Opinion issued in corresponding Singaporean application No. 11202002054Q, dated Jun. 28, 2021, 7 pp.

Office Action, dated Nov. 12, 2021, from related European Patent App. No. 17191639.8.

Japan Office Action, issued by the Japanese Patent Office, mailed Aug. 3, 2021, regarding corresponding patent application Serial No. JP 2020-515921; 6 pages with translation.

* cited by examiner

CONFLICT RESOLUTION METHOD FOR A REMOTELY CONTROLLED DEVICE AND CONFLICT RESOLUTION SYSTEM

Aspects of the invention relate to a conflict resolution method for a remotely controlled device. Further aspects relate to a conflict resolution system.

TECHNICAL BACKGROUND

Concepts for remotely controlled devices, e.g. vessels, that are at least partially controlled by sending commands to the vessel from a control center are known. However, during the transition to such remotely controlled vessels and also after the transition in certain situations, there will be an on-board crew on the vessel, and commands can come from both the on-board crew and the control center. This can lead to situations where commands are issued by the on-board crew and a control center that are conflicting, requiring some form of resolution mechanism. Failure to resolve such conflicts can endanger both the safety and the security of a vessel.

In other words, for (partially) remotely controlled vessels with hybrid control, i.e., some control exercised by an on-board crew, control conflicts can happen, such as conflicting commands being issued by the control center and an on-board crew. Unless such conflicts are resolved, the safety and security of a vessel can be endangered. Additionally, there are other situations that require control conflict resolution, for example attacks where a vessel has been taken over by pirates and on-board control should be locked out, or situations where the control center has to take control because the crew is incapacitated.

Thus, there is a need for a conflict resolution method for a remotely controlled device and a conflict resolution system that overcome in least in part some of these problems, in particular that can provide a mechanism to mitigate or resolve such conflicts.

SUMMARY OF THE INVENTION

In view of the above, a conflict resolution method for a remotely controlled device according to claim 1, and a conflict resolution system according to claim 12 are provided.

According to an aspect, conflict resolution method for a remotely controlled device is provided. The conflict resolution method includes: issuing a command for the device by a remote control center or by the device; determining a criticality level of the command; depending on the criticality level of the command, sending the command to the other one of the device and the control center for acknowledgment or refusal of the command; and executing or disregarding the command by the device depending on the criticality level of the command and, if applicable, on the acknowledgment or refusal of the command.

According to a further aspect, a conflict resolution system is provided. The conflict resolution system includes: a device to be remotely controlled; and a remote control center, wherein the at least one of the device and the control center is configured to issue a command for the device; determine a criticality level of the command; and depending on the criticality level of the command, send the command to the other one of the device and the control center for acknowledgment or refusal of the command, wherein the device is configured to execute or disregard the command depending on the criticality level of the command and, if applicable, on the acknowledgment or refusal of the command.

An advantage is that conflicting commands can be resolved and a secure and reliable remote control of the device can be provided.

Further advantages, features, aspects and details that can be combined with embodiments described herein are evident from the dependent claims, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Figure 1:
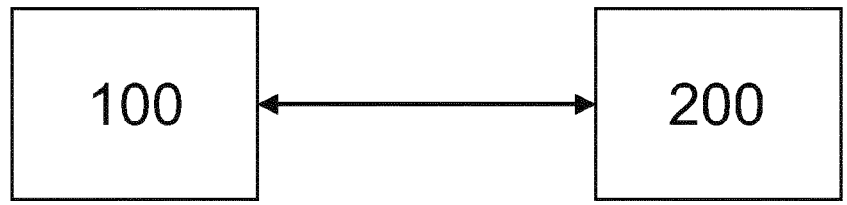
FIG. 1 is a schematic view of a conflict resolution system according to embodiments.

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

The present disclosure provides mechanisms for control conflict resolution, e.g. when commands from an on-board crew and a device are conflicting with commands from a remote control center. The present application proposes such conflict resolution mechanisms, as well as concepts for situations where control needs to be assumed by one party (e.g., in order to prevent attackers from taking control of the device or to take over control from an incapacitated crew).

In situations where a remotely controlled device, such as a vessel, still has an on-board crew, or a partial on-board crew (e.g., an engineering team), it is possible that commands issued by a remote control center conflict with commands issued locally by the on-board crew. Depending on the criticality of a command, this can lead to safety-critical issues (e.g., conflicting steering commands).

To prevent these issues, embodiments described herein can work with different criticality levels and/or control modes of commands. The criticality level of a command may determine under which modalities a command can be executed. The control mode may determine the larger division of responsibilities between the remote control center and the device.

In particular, each command can be assigned a criticality level, which may determine whether any acknowledgement by the opposite party (either the remote control center or the device) is necessary before a command can be executed. Generally speaking, commands with a low criticality level typically do not require an acknowledgement before being executed. Commands with a high criticality level can require acknowledgement before they can be executed on the device. In addition, there may be a provision for executing commands prophylactically and requiring a retroactive acknowledgement, e.g. for situations where quick reaction times are required (e.g., avoiding a collision), and/or the regular procedure of obtaining an acknowledgement cannot be followed. If the command is not acknowledged within a specified time frame, the action can be reversed by reverting system parameters to the parameters before the prophylactic action was carried out (e.g., changing the course back to the original course).

FIG. 1 shows a conflict resolution system. The conflict resolution system includes a device 200 to be remotely controlled and/or a remote control center 100. Although the present disclosure is described in the context of a remotely controlled vessel (e.g., a ship) in several instances, the device 200 can be any remotely controlled device, such as an asset, e.g., a remotely controlled machinery in a mine. According to embodiments described herein, the device 200 can be a moveable vessel. Further, the device 200 can be a device able to perform a physical task. Furthermore, the device 200 can include an actuator for moving the device 200 and/or changing a direction of travel of the device 200.

According to embodiments described herein, the device 200 can be a moveable vessel and/or the control center can be stationary. Further, the control center can be a moveable vessel and/or can be on board of a moveable vessel. According to embodiments described herein, the device 200 and the control center 100 can be remote from each other.

The device 200 and/or the remote control center 100 can be configured for establishing a communicative link to the other one of the device 200 and the remote control center 100 in order to communicate with the other one of the device 200 and the remote control center 100.

At least one of the device 200 and the remote control center 100 can be configured to issue a command for the device 200. The command can be issued by a system component of the at least one of the device 200 and the remote control center 100. The system component can issue the command on its own, i.e. by an automatic process, or on behalf of an operator who manually issues the command.

The at least one of the device 200 and the remote control center 100 can be configured to determine a criticality level of the command. In the context of the present disclosure, a "criticality level", such as the criticality level determined by the at least one of the device 200 and the remote control center 100, can be understood as an value that may determine under which modalities a command can be executed. Specifically the criticality level may determine whether any acknowledgement by the opposite party (the other one of the device 200 and the remote control center 100) is necessary before a command can be executed. The criticality level may take several values, e.g. from low to high, specifically low and high. Commands with a low criticality level may not require an acknowledgement before being executed. Commands with a high criticality level may require acknowledgement before they can be executed on the device 200.

The at least one of the device 200 and the remote control center 100 can be configured to send the command to the other one of the device 200 and the control center 100 for acknowledgment and/or refusal of the command. The at least one of the device 200 and the remote control center 100 can be configured to send the command to the other one of the device 200 and the control center 100 depending on the criticality level of the command.

That is, the command can be sent to the other one of the device 200 and the control center 100 if the criticality level of the command indicates that an acknowledgement by the other one of the device 200 and the control center 100 is required. For a low criticality level, the command may not be sent to the other one of the device 200 and the control center for acknowledgment or refusal of the command. For a high criticality level, the command may be sent to the other one of the device 200 and the control center for acknowledgment or refusal of the command.

According to embodiments described herein, necessity of an acknowledgement for executing the command depends on the criticality level of the command. According to embodiments described herein, the command can be sent to the other one of the device 200 and the control center 100 for acknowledgment or refusal of the command, specifically if the criticality level is high. According to embodiments described herein, the command may not sent to the other one of the device 200 and the control center 100 for acknowledgment or refusal of the command if the criticality level is low.

The device 200 can be configured to execute or disregard the command depending on the criticality level of the command. Further, if applicable, the device 200 can be configured to execute or disregard the command depending on the acknowledgment or refusal of the command. For instance, for commands having a low criticality level, the device 200 can be configured to execute the command without awaiting an acknowledgment. For commands having a high criticality level, the device 200 can be configured to execute the command after receipt of the acknowledgment. If the device 200 does not receive an acknowledgment for a command having a high criticality level or a refusal thereof, the device 200 can be configured not to execute the command.

Although the remote control center 100 and/or device 200, specifically an operator having access to the remote control center 100 and/or device 200, can acknowledge or refuse the command, the remote control center 100 and/or device 200 may not be forced to react on the command. For instance, the remote control center 100 and/or device 200 can ignore the command. In such a situation, no acknowledgment or refusal will be sent to the other one of the remote control center 100 and device 200.

After receiving the command, the device 200 can carry out the command. Specifically, the device 200 may perform a certain task given by the command. For instance, in case of the device 200 being a vessel, the command can instruct the vessel to perform a certain maneuver, such as turn left. The command may be issued by an operator on the device 200, such as an on-board crew, captain or pilot, or may be issued by an operator remote from the device 200. Furthermore, the command may trigger a maintenance task or a release.

The present disclosure enables remote control of devices and enables more sophisticated remote control applications, such as remotely controlled devices. Furthermore, embodiments of the present application can improve the safety and security of remotely controlled devices. According to embodiments described herein, the criticality level of the command can be changed. Specifically, the criticality level of the command can be changed while the device 200 is performing its intended operation. The intended operation of the device may be the normal operation of the device 200, i.e. whatever the device 200 is designed for. That is, there may no maintenance stop or the like be required for changing the criticality level.

Figure 2:
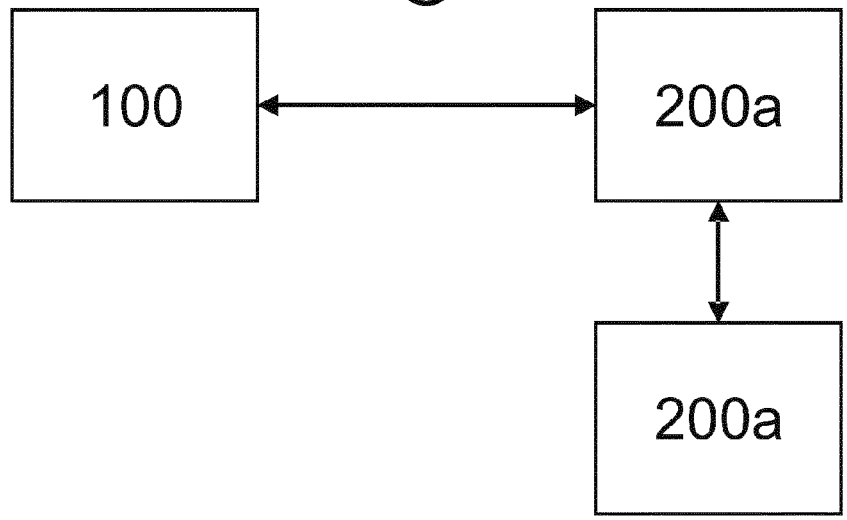
FIG. 2 is a schematic view of a conflict resolution system according to embodiments.
Figure 3:
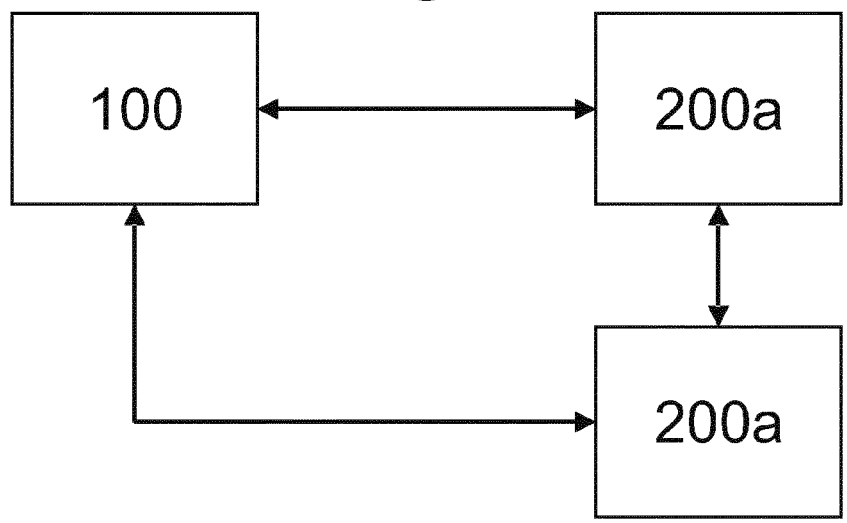
FIG. 3 is a schematic view of a conflict resolution system according to embodiments.

Although one device 200 is shown in FIG. 1, any number of devices 200 can be provided. FIGS. 2 and 3 show at least two devices 200a, 200b. Accordingly, the conflict resolution system can include at least two devices 200a, 200b. The at least two devices each can be identical or similar to the device 200. Further, the at least two devices 200a, 200a may differ in various features while having features of the device 200 in common.

FIG. 2 shows communicative link being established between the remote control center 100 and a first device 200a of the at least two devices 200a, 200b in order to provide communication between the remote control center 100 and a first device 200a of the at least two devices 200a, 200b. Further, at least one of the first device 200a and a second device 200b of the at least two devices 200a, 200b can be configured for establishing a communicative link to the other one of the first device 200a and a second device 200b of the at least two devices 200a, 200b in order to communicate with the other one of the first device 200a and a second device 200b of the at least two devices 200a, 200b. With the above communication scheme, the remote control center 100 may communicate with the first device 200a of the at least two devices 200a, 200b. For example if the command is intended for the second device 200b of the at least two devices 200a, 200b, the first device 200a of the at least two devices 200a, 200b can forward the command to the second device 200b of the at least two devices 200a, 200b. Thereby, also a communication between the remote control center 100 and the second device 200b of the at least two devices 200a, 200b can be established, specifically with the first device 200a of the at least two devices 200a, 200b as an intermediate player.

FIG. 3 shows a further communication link being established between the remote control center 100 and the second device 200b of the at least two devices 200a, 200b in order to provide communication between the remote control center 100 and the second device 200b of the at least two devices 200a, 200b. When practicing embodiments, reliability of the communicative link can be improved. Specifically, the remote control center 100 needs to be in communication reach with only one of the at least two devices 200a, 200b, while the one device of the at least two devices 200a, 200b being in communication with the remote control center 100 can act as a relay for the communication to the other devices of the at least two devices 200a, 200b.

According to embodiments described herein, at least one of the remote control center 100 and the device 200, specifically and at least one of the at least two devices 200a, 200b, may include a network interface for connecting the device to a data network, in particular a global data network. The data network may be a TCP/IP network such as the Internet. The at least one of the remote control center 100 and the device 200, specifically and at least one of the at least two devices 200a, 200b, can be operatively connected to the network interface for carrying out commands received from the data network. The commands may include a control command for controlling the device to carry out a task such as moving the device 200 and/or changing a direction of travel of the device 200. In this case, the device 200 can be adapted for carrying out the task in response to the control command. The commands may include a status request. In response to the status request, or without prior status request, the at least one of the remote control center 100 and the device 200, specifically and at least one of the at least two devices 200a, 200b, may be adapted for sending a status information to the network interface, and the network interface is then adapted for sending the status information over the network. The commands may include an update command including update data. In this case, the at least one of the remote control center 100 and the device 200, specifically and at least one of the at least two devices 200a, 200b, can be adapted for initiating an update in response to the update command and using the update data.

The data network may be an Ethernet network using TCP/IP such as a LAN, WAN or the Internet. The data network may include distributed storage units such as a cloud. Depending on the application, the cloud can be in form of public, private, hybrid or community cloud.

The network interface can be configured to transceive digital signal/data between the at least one of the remote control center 100 and the device 200, specifically and at least one of the at least two devices 200a, 200b, and the data network, wherein the digital signal/data include operational command and/or information about the device or the network. Specifically, the network interface and/or the data network can be used for establishing the communicative link between the remote control center 100 and the device 200, specifically and at least one of the at least two devices 200a, 200b.

While it is sometimes referred to "a device 200" and sometimes to "at least two devices 200a, 200b" in the present disclosure, it is envisaged that that any of these references may refer to the other one. Accordingly, unless stated otherwise, whenever it is referred to "a device 200" this reference can be understood as referring to "at least two devices 200a, 200b" too. That is, the wording "a device 200" can encompass the wording "at least two devices 200a, 200b". According to embodiments described herein, a control mode of the device 200 can be determined. At least one of the device 200 and the remote control center 100 can be configured to determine the control mode. Specifically, the one of the device 200 and the remote control center 100 determining the criticality level of the command can determine the control mode of the device 200. According to embodiments described herein, sending the command and executing or disregarding the command can further depend on the control mode of the device 200.

The control mode can include a normal mode, a remote control center priority mode, a device priority mode, a remote control center lockout mode and a device lockout mode.

According to embodiments described herein, the command can be sent to the other one of the device 200 and the remote control center 100 for acknowledgment or refusal of the command irrespective of the criticality level when the control mode is set to a priority mode for the other one of the device 200 and the remote control center 100 issuing the command.

According to embodiments described herein, the command can be disregarded when the control mode is set to a lockout mode for the one of the device 200 and the control center 100 issuing the command.

According to embodiments described herein, the command needs to be acknowledged by the other one of the device 200 and the control center 100 irrespective of the criticality level when the control mode is set to a lockout mode for the one of the device 200 and the control center 100 issuing the command.

Table 1 shows an overview of control modes and priority rankings assigned to the remote control center 100 and the device 200 for the control modes.

TABLE 1

| Control Mode | Remote Control Center | Device |
|---|---|---|
| Normal | no priority | no priority |
| Remote Control Center Priority | priority | no priority |
| Device Priority | no priority | priority |
| Remote Control Center Lockout | no priority | absolute priority |
| Device Lockout | absolute priority | no priority |

Normal Control Mode

In the normal control mode (see Table 2), the remote control center 100 and the device 200 can have equal priority. Accordingly, whether a command needs to be acknowledged can depend on the criticality level of the command. Specifically, whether a command needs to be acknowledged can depend only on the criticality level of the command. As can be seen from Table 2, if the remote control center 100 sends a command with low criticality to the device 200, no acknowledgement is necessary from the device 200, e.g. the on-board crew, before the command is executed. Likewise, if the device 200 issues a command, the remote control center 100 does not need to acknowledge the command before it is executed on the device 200. If, on the other hand, the remote control center 100 sends a command with high criticality, the device 200 needs to acknowledge the command before it is executed. Likewise, if the device 200 issues a command with high criticality, the remote control center 100 needs to acknowledge the command before it is executed on the device.

In addition, prophylactic execution with retroactive acknowledgement is possible from either side. According to embodiments described herein, the command can be executed before the device 200 receives an acknowledgment or refusal of the command. Further, execution of the command can be rolled-back if the device 200 receives a refusal of the command after starting execution of the command.

TABLE 2

| Criticality Level | Remote Control Center | Device |
|---|---|---|
| Low Criticality Level | no acknowledgement | no acknowledgement |
| High Criticality Level | mandatory acknowledgement | mandatory acknowledgement |

Remote Control Center Priority Mode

In the remote control center priority mode (see Table 3), the commands of the remote control center 100 can take priority. Accordingly, if the remote control center 100 issues a command, the command can be directly executed, specifically without requiring an acknowledgement by the device 200, e.g. the on-board crew, irrespective of the criticality level of the command. Further, if a command is issued by the device 200, it has to be acknowledged by the remote control center before it can be executed, irrespective of the criticality level of the command.

According to embodiments described herein, the command can be sent to the remote control center 100 for acknowledgment or refusal of the command irrespective of the criticality level when the control mode is set to a priority mode for the remote control center 100.

Furthermore, the device 200 can execute commands prophylactically with retroactive acknowledgement, specifically if circumstances require it (e.g., emergency situations).

TABLE 3

| Criticality Level | Remote Control Center | Device |
|---|---|---|
| Low Criticality Level | no acknowledgement | mandatory acknowledgement |
| High Criticality Level | no acknowledgement | mandatory acknowledgement |

Device Priority Mode

In the device priority mode (see Table 4), commands issued by the device 200 can take priority over the commands issued by the remote control center 100. Accordingly, commands issued by the remote control center 100 may need to be acknowledged by the device 200, irrespective of the criticality level. Command issued by the device 200 can be executed directly.

According to embodiments described herein, the command can be sent to the device 200 for acknowledgment or refusal of the command irrespective of the criticality level when the control mode is set to a priority mode for the device 200.

Further, the control center can issue commands that are executed prophylactically with retroactive acknowledgement, e.g. for emergency situations.

TABLE 4

| Criticality Level | Remote Control Center | Device |
|---|---|---|
| Low Criticality Level | mandatory acknowledgement | no acknowledgement |
| High Criticality Level | mandatory acknowledgement | no acknowledgement |

Remote Control Center Lockout Mode

In the remote control center lockout mode (see Table 5), the device 200 can issue commands without acknowledgement by the remote control center 100. Further, all commands issued by the remote control center 100 may have to be acknowledged. Further, no retroactive acknowledgement by the control center may be available. The remote control center lockout mode may be intended for extreme situations, such as the remote control center 100 being taken over by enemy forces. According to embodiments described herein, a command issued by the remote control center 100 can be disregarded when the control mode is set to a lockout mode for remote control center 100 issuing the command.

According to embodiments described herein, the command needs to be acknowledged by the device 200 irrespective of the criticality level when the control mode is set to a lockout mode for the control center 100 issuing the command.

TABLE 5

| Criticality Level | Remote Control Center | Device |
|---|---|---|
| Low Criticality Level | mandatory acknowledgement, no prophylactic execution | no acknowledgement |
| High Criticality Level | mandatory acknowledgement, no prophylactic execution | no acknowledgement |

Device Lockout Mode

In the device lockout mode (see Table 6), the remote control center 100 can issue commands without acknowledgement by the device 200. Further, all commands issued by the device 200 have to be acknowledged. In addition, the device 200 cannot execute commands prophylactically with retroactive acknowledgement by the remote control center 100. The device lockout mode can be intended for extreme situations, such as a device 200 being boarded by pirates.

TABLE 6

| Criticality Level | Remote Control Center | Device |
|---|---|---|
| Low Criticality Level | no acknowledgement | mandatory acknowledgement, no prophylactic execution |
| High Criticality Level | no acknowledgement | mandatory acknowledgement, no prophylactic execution |

According to embodiments described herein, the control mode of the device 200 can be changed. Specifically, the control mode of the device 200 can be changed while the device 200 is performing its intended operation. The intended operation of the device may be the normal operation of the device 200, i.e. whatever the device 200 is designed for. That is, there may no maintenance stop or the like be required for changing the control mode. The control mode can be changed by at least one of the device 200 and the remote control center 100. Further, when the control mode is set to a lockout mode for one of the device 200 and the control center 100, the one of the device 200 and the control center 100 being set to lockout mode may not be able to change the control mode. Further, the control mode can be changed dynamically, e.g. depending on circumstances. To ensure that the conflict resolution system if still conflict-free, the transition to a different mode may follow control center priority, Accordingly, the remote control center 100 can change the mode without acknowledgement. If the device 200 issues a command to change the mode, the control center needs to acknowledge the command first (see Table 7).

TABLE 7

| | Remote Control Center | Device |
|---|---|---|
| Mode Transition | no acknowledgement | mandatory acknowledgement, no prophylactic execution |

Figure 4:
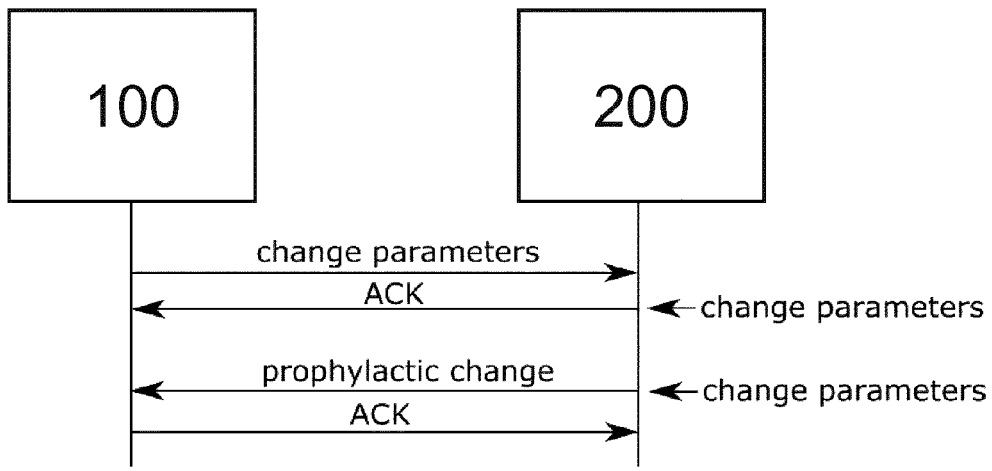
FIG. 4 is a view illustrating processes in a conflict resolution system according to embodiments.

FIG. 4 illustrates processes in a conflict resolution system according to embodiments. In FIG. 4, a high-criticality command is issued in normal mode by the remote control center 100 to change some parameters at the remotely controlled device 200. The device 200 changes the parameters and responds with an acknowledgement.

As further shown in FIG. 4, the device 200 thereafter issues a command and changes parameters itself prophylactically, i.e., prior to receiving the acknowledgement from the control center. If the remote control center 100 were to refuse the change, the device 200 would revert the changes.

Figure 5:
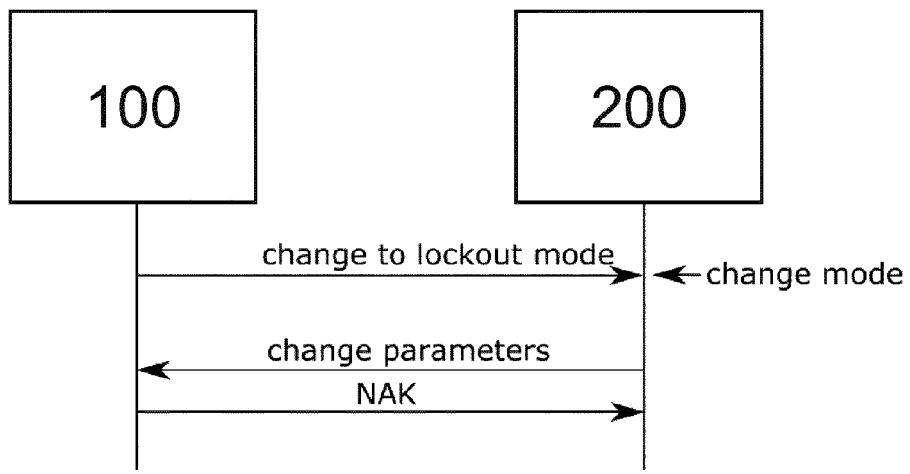
FIG. 5 is a view illustrating processes in a conflict resolution system according to embodiments.

FIG. 5 illustrates processes in a conflict resolution system according to embodiments. In FIG. 5, the remote control center 100 changes the control mode of the device 200 to the lockout mode due to an emergency. The device 200 can then no longer perform any action before receiving an acknowledgement from the remote control center 100. In the example of FIG. 5, the device 200 tried to change some parameters after the device 200 had entered the lockout mode, and this change is denied by the remote control center 100.

Figure 6:
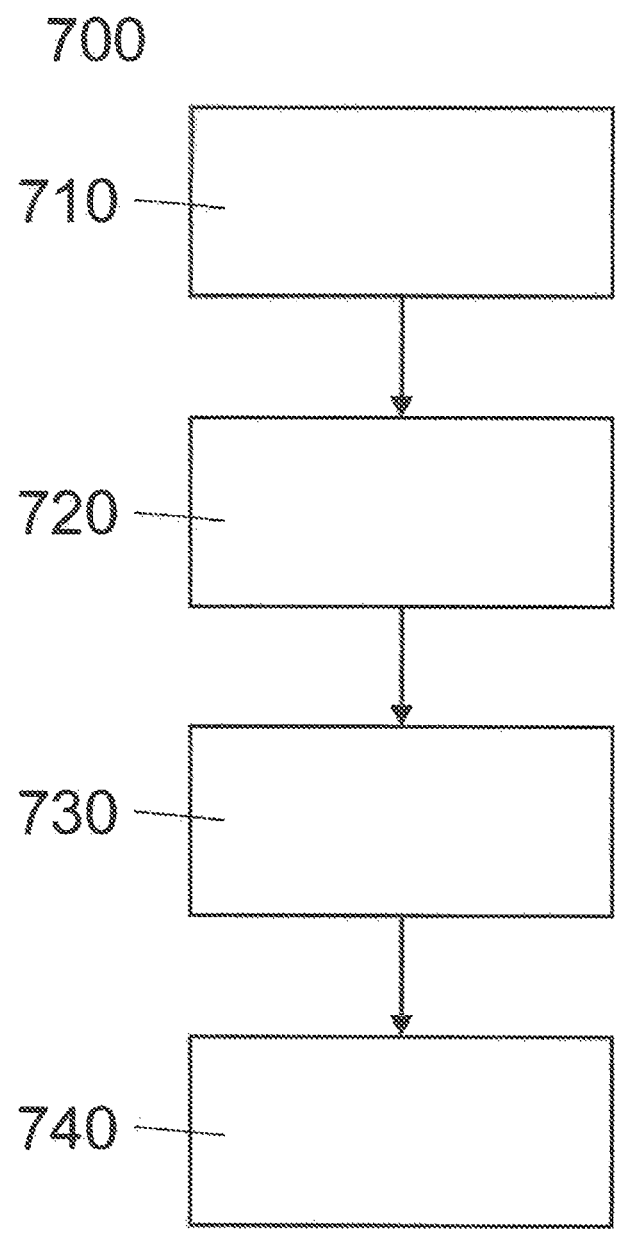
FIG. 6 is a flow diagram of a conflict resolution method according to embodiments.

FIG. 6 shows a flow diagram of a conflict resolution method 600 for a remotely controlled device 200. In block 710, a command for the device 200 can be issued by a remote control center 100 or by the device 200. In block 720, a criticality level of the command can be determined. In block 730, depending on the criticality level of the command, the command can be sent to the other one of the device 200 and the control center 100 for acknowledgment or refusal of the command. In block 740, the command can be executed or disregarded by the device 200 depending on the criticality level of the command and, if applicable, on the acknowledgment or refusal of the command.

The invention claimed is:

1. A conflict resolution method for a device comprising:
   issuing a command for the device by the device,
   wherein the device can issue the command on its own;
   determining, by the device in response to the command issued by the device, a criticality level of the command;
   depending on the criticality level of the command, sending the command to a remote control center for acknowledgment or refusal of the command; and
   executing or disregarding the command by the device depending on the criticality level of the command and based on the acknowledgment or refusal of the command;
   wherein the criticality level determines whether any acknowledgment by the remote control center is necessary before the command is executed;
   wherein issuing the command for the device by the device comprises:
   determining a control mode of the device by the device,
   wherein sending the command to the remote control center by the device further depends on the control mode of the device,
   wherein executing or disregarding the command by the device further depends on the control mode of the device,
   wherein, in a normal control mode, the device is configured to send the command to the remote control center by the device based on the determined criticality level of the command, wherein, in a priority mode of the device, the device is configured to directly execute the commands irrespective of the criticality level of the command, and wherein, in a lockout mode of the device, the command needs to be acknowledged by the remote control center irrespective of the criticality level of the command;
   in response to determining that the control mode of the device is in the normal mode and the criticality level of the command is high,
   the command from the device is executed by the device before the device receives an acknowledgment or refusal of the command from the remote control center in response to determining the acknowledgment or the refusal cannot be obtained within a specified time frame, and
   wherein, in response to the acknowledgment or refusal of the command not being received from the remote control center within the specified time frame, the command is reversed by reverting parameters of the device to the parameters before the command was executed by the device; and
   changing the control mode of the device by the remote control center.

2. The method according to claim 1, further comprising: changing the criticality level of the command.

3. The method according to claim 1, wherein the command is sent to the remote control center for acknowledgment or refusal of the command if the criticality level is high.

4. The method according to claim 1, wherein the command is not sent to the remote control center for acknowledgment or refusal of the command if the criticality level is low.

5. The method according to claim 1, wherein the command is sent to the remote control center for acknowledgment or refusal of the command irrespective of the criticality level when the control mode is set to a priority mode for the remote control center.

6. The method according to claim 1, wherein the command is given priority over commands issued by the remote control center for the device when the control mode is set to a priority mode for the device.

7. The method according to claim 1, wherein the command needs to be acknowledged by the other one of the device and the control center irrespective of the criticality level when the control mode is set to a lockout mode for the one of the device and the control center issuing the command.

8. A conflict resolution system, comprising:
a device to be remotely controlled; and
a remote control center,
wherein the device is configured to:
issue a command for the device on its own;
determine a criticality level of the command, by the device issuing the command in response to the command issued by the device; and
depending on the criticality level of the command, send the command to the remote control center for acknowledgment or refusal of the command,
wherein the device is configured to:
execute or disregard the command depending on the criticality level of the command and, if applicable, on the acknowledgment or refusal of the command;
wherein issuing the command for the device comprises:
determine a control mode of the device by the device,
wherein sending the command by the device for acknowledgment or refusal of the command from the device to the remote control center further depends on the control mode of the device,
wherein executing or disregarding the command by the device further depends on the control mode of the device,
wherein, in a normal control mode, the device is configured to send the command to the remote control center by the device based on the determined criticality level of the command, wherein, in a priority mode of the device, the device is configured to directly execute the commands irrespective of the criticality level of the command, and wherein, in a lockout mode of the device, the command needs to be acknowledged by the remote control center irrespective of the criticality level of the command;
in response to determining that the control mode of the device is in the normal mode and the criticality level of the command is high,
the command from the device is executed by the device before the device receives an acknowledgment or refusal of the command from the remote control center in response to determining the acknowledgment or the refusal cannot be obtained within a specified time frame, and
wherein, in response to the acknowledgment or refusal of the command not being received from the remote control center within the specified time frame, the command is reversed by reverting parameters of the device to the parameters before the command was executed by the device; and
changing the control mode of the device by the remote control center.

9. The conflict resolution system of claim 8, wherein the device is a moveable vessel and the remote control center is stationary.

10. The conflict resolution system of claim 8, wherein the device, and the remote control center are remote from each other.

11. The conflict resolution system of claim 8, wherein at least one of the device, and the remote control center comprises a network interface for connecting the device to a data network, in particular a global data network.

12. The method according to claim 1, further comprising changing the criticality level of the command.

13. The method according to claim 1, wherein the command is sent to the remote control center for acknowledgment or refusal of the command if the criticality is high.

14. The method according to claim 1, wherein the command is not sent to the remote control center for acknowledgment or refusal of the command if the criticality level is low.

15. The conflict resolution system of claim 9, wherein the device and the remote control center are remote from each other.

16. The conflict resolution system of claim 10, wherein at least one of the device, and the remote control center comprises a network interface for connecting the device to a data network.

17. The conflict resolution system of claim 8, wherein the command is sent to the remote control center for acknowledgment or refusal of the command irrespective of the criticality level when the control mode is set to a priority mode for the remote control center.

18. The conflict resolution system of claim 8, wherein the command is given priority over commands issued by the remote control center for the device when the control mode is set to a priority mode for the device.

* * * * *